United States Patent
Ishimatsu

(10) Patent No.: US 8,807,755 B2
(45) Date of Patent: Aug. 19, 2014

(54) POLARIZATION BEAM SPLITTING ELEMENT AND IMAGE PROJECTION APPARATUS

(75) Inventor: Rie Ishimatsu, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 148 days.

(21) Appl. No.: 13/439,032

(22) Filed: Apr. 4, 2012

(65) Prior Publication Data

US 2012/0257168 A1    Oct. 11, 2012

(30) Foreign Application Priority Data

Apr. 8, 2011    (JP) .................................. 2011-085951

(51) Int. Cl.
*G03B 21/14* (2006.01)

(52) U.S. Cl.
USPC ........ 353/20; 353/8; 353/30; 353/98; 353/99; 353/122; 349/96; 349/193; 349/194

(58) Field of Classification Search
USPC ........... 353/8, 20, 30, 31, 37, 38, 98, 99, 122; 348/744–747, E9.027; 349/5–10, 18, 349/96, 193, 194; 359/489.07, 189.15, 359/487.06
See application file for complete search history.

(56) References Cited

U.S. PATENT DOCUMENTS

| | | | |
|---|---|---|---|
| 7,502,078 B2* | 3/2009 | Suzuki | 349/8 |
| 7,714,945 B2* | 5/2010 | Tan et al. | 349/8 |
| 7,722,194 B2* | 5/2010 | Amako et al. | 353/98 |
| 2005/0231690 A1* | 10/2005 | Newell et al. | 353/20 |
| 2006/0262250 A1* | 11/2006 | Hobbs | 349/96 |
| 2008/0055549 A1* | 3/2008 | Perkins et al. | 353/20 |
| 2008/0117509 A1* | 5/2008 | Hayashi et al. | 359/486 |
| 2010/0053538 A1* | 3/2010 | Chao et al. | 349/194 |

FOREIGN PATENT DOCUMENTS

| | | | |
|---|---|---|---|
| JP | 2003-502708 A | | 1/2003 |
| JP | 2003-519818 A | | 6/2003 |
| JP | 2005-321562 A | | 11/2005 |
| WO | 00/79317 A1 | | 12/2000 |
| WO | 01/51964 A1 | | 7/2001 |

* cited by examiner

*Primary Examiner* — Sultan Chowdhury

(74) *Attorney, Agent, or Firm* — Rossi, Kimms & McDowell LLP

(57) ABSTRACT

The polarization beam splitting element is configured to reflect or transmit an entering beam according to its polarization direction. The element includes, in order from a beam entrance side, a base member having a light transmissive property, a first one-dimensional grating structure formed of a dielectric material and having, in a first direction, a first grating period smaller than a wavelength of the entering beam, and a second one-dimensional grating structure formed of a metal and having, in a second direction orthogonal to the first direction, a second grating period smaller than the wavelength of the entering beam.

11 Claims, 12 Drawing Sheets

POLARIZATION BEAM SPLITTING ELEMENT AND IMAGE PROJECTION APPARATUS

BACKGROUND OF THE INVENTION

1. Field of the Invention

The present invention relates to a polarization beam splitting element that reflects or transmits an entering beam according to its polarization direction, and particularly to a polarization beam splitting element that is constituted by a wire grid (one-dimensional grating structure) having a grating period smaller than a wavelength of the entering beam and by a dielectric multi-layered film layer.

2. Description of the Related Art

A wire grid that is a one-dimensional grating structure formed of a metal and having a grating period smaller than a wavelength (also referred to as a "use wavelength") of an entering beam has a function of splitting beams whose polarization directions are mutually different. Japanese Patent Laid-Open No. 2003-502708 discloses a wire grid having a visible wavelength-order minute grating period and formed on a substrate. Moreover, Japanese Patent Laid-Open No. 2003-519818 discloses a wire grid polarization beam splitting element that is used by being sandwiched between transparent substrates such as prisms, for the purpose of suppressing generation of astigmatism at the substrate and of improving handling easiness of grating.

On the other hand, a dielectric grid that is a one-dimensional grating structure formed of a dielectric material and having a grating period smaller than the use wavelength has mutually different effective refractive indices in a grating longitudinal direction (direction orthogonal to a grating period direction) and in a grating width direction (corresponding to the grating period direction). Japanese Patent Laid-Open No. 2005-321562 discloses a polarization beam splitting element in which dielectric grids being laminated such that their grating period directions are orthogonal to one another are sandwiched by two prisms, for the purpose of utilizing the above-mentioned characteristic of the dielectric grid.

The wire grid reflects polarized light (hereinafter referred to as "first polarized light") whose electric field oscillates in a direction parallel to the grid longitudinal direction, and transmits polarized light (hereinafter referred to as "second polarized light") whose electric field oscillates in a direction orthogonal to the grid longitudinal direction (that is, orthogonal to the polarization direction of the first polarized light). However, in fact, the wire grid transmits or absorbs part of the first polarized light to be reflected, and reflects or absorbs part of the second polarized light to be transmitted. Conventional wire grids have an increased grating thickness so as to sufficiently split the first polarized light and the second polarized light (that is, so as to suppress the transmission of the first polarized light). However, the increased grating thickness increases the absorption of the second polarized light to be transmitted, which decreases transmittance therefore.

In addition, the wire grid polarization beam splitting element used by being sandwiched between the transparent substrates such as the prisms has a tendency to deteriorate characteristics for the second polarized light to be transmitted, which increases reflectance for the second polarized light as compared with a case where an entrance side medium is formed by air or formed as a vacuum space.

On the other hand, the polarization beam splitting element disclosed in Japanese Patent Laid-Open No. 2005-321562 which uses the dielectric grids utilizes total reflection for s-polarized light reflection, so that reflectance for s-polarized light with small incident angles significantly decreases.

SUMMARY OF THE INVENTION

The present invention provides a polarization beam splitting element using a wire grid and a dielectric grid, and being capable of providing good transmittance and reflectance in a wide incident angle range, and provides an image projection apparatus using the polarization beam splitting element.

The present invention provides as one aspect thereof a polarization beam splitting element configured to reflect or transmit an entering beam according to its polarization direction. The element includes, in order from a beam entrance side, a base member having a light transmissive property, a first one-dimensional grating structure formed of a dielectric material and having, in a first direction, a first grating period smaller than a wavelength of the entering beam, and a second one-dimensional grating structure formed of a metal and having, in a second direction orthogonal to the first direction, a second grating period smaller than the wavelength of the entering beam.

The present invention provides as another aspect thereof an image projection apparatus including the above polarization beam splitting element.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

First of all, prior to description of specific embodiments, a configuration of a polarization beam splitting element that is a representative embodiment of the present invention will be described with reference to FIGS. 1 and 2.

The polarization beam splitting element 10 is constituted by two prisms 1 and 2 that are base members each having a light transmissive property and a polarization beam splitting part 3 disposed between the prisms 1 and 2.

Figure 1:
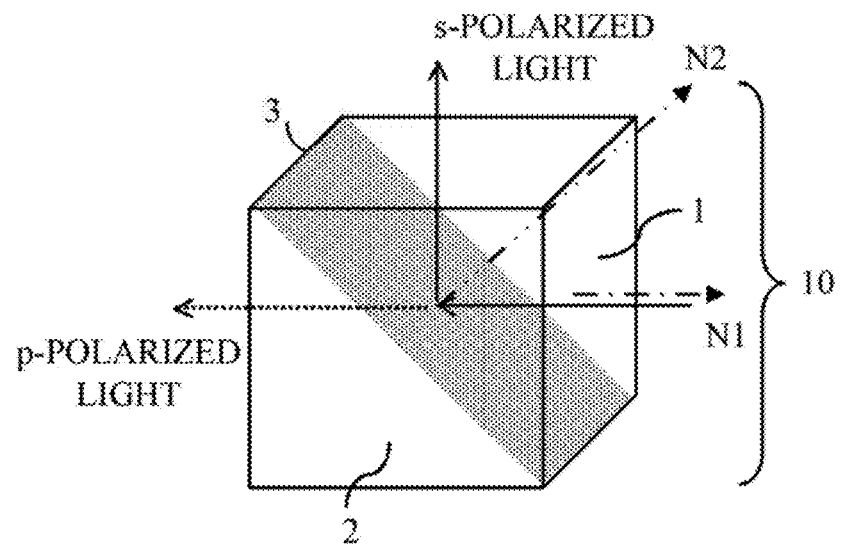
FIG. 1 shows a configuration of a polarization beam splitting element that is a representative embodiment of the present invention.

In FIG. 1, a plane including a normal N1 to a beam entrance surface of the prism 1 and including a normal N2 to an interface between the prism 1 and the polarization beam splitting part 3 (that is, a dielectric grid described later) is defined as an entrance plane (not shown). A beam (light) whose electric field oscillates in the entrance plane is referred to as "p-polarized light (first polarized light)", and a beam (light) whose electric field oscillates in a direction orthogonal to the entrance plane (that is, in a normal direction to the entrance plane) is referred to as "s-polarized light (second polarized light)".

An entering beam that is non-polarized light including the p-polarized light and the s-polarized light is transmitted through the prism 1 that is an entrance side (also a reflected beam exit side) base member, and then enters the polarization beam splitting part 3. The polarization beam splitting part 3 reflects the s-polarized light of the entering beam and transmits the p-polarized light thereof by its polarization splitting function. The s-polarized light reflected by the polarization beam splitting part 3 is transmitted through the prism 1 to exit from the polarization beam splitting element 10. On the other hand, the p-polarized light transmitted through the polarization beam splitting part 3 is transmitted through the prism 2 that is a transmitted beam exit side base member to exit from the polarization beam splitting element 10. A wavelength of the entering beam, that is, a use wavelength is whole or part of a visible wavelength range of 400 nm (or 430 nm)-700 nm.

In the following description, an oscillation direction of an electric field of polarized light is referred to as "a polarization direction". A detailed configuration of the polarization beam splitting part 3 will be described later.

Figures 20A, 20B:
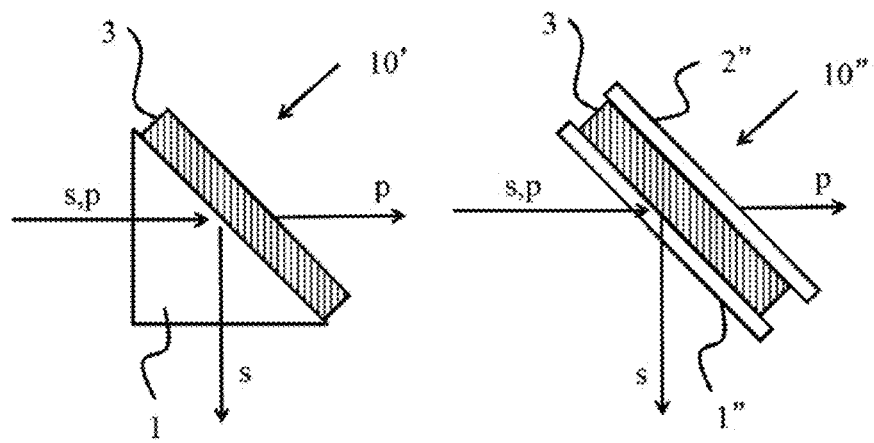
FIGS. 20A and 20B show modified embodiments of the present invention.

Although this embodiment treats the polarization beam splitting part 3 and the prisms 1 and 2 sandwiching the polarization beam splitting part 3 collectively as the polarization beam splitting element 10, the transmitted beam exit side prism 2 is not necessarily needed for the polarization beam splitting element. For example, as shown in FIG. 20A a polarization beam splitting element 10' may be constituted only by the beam entrance side prism 1 and the polarization beam splitting part 3. Moreover, as shown in FIG. 20B a polarization beam splitting element 10" may be constituted by disposing the polarization beam splitting part 3 between two planar substrates 1" and 2" as base members each having a light transmissive property, instead of the prisms 1 and 2.

Figure 2:
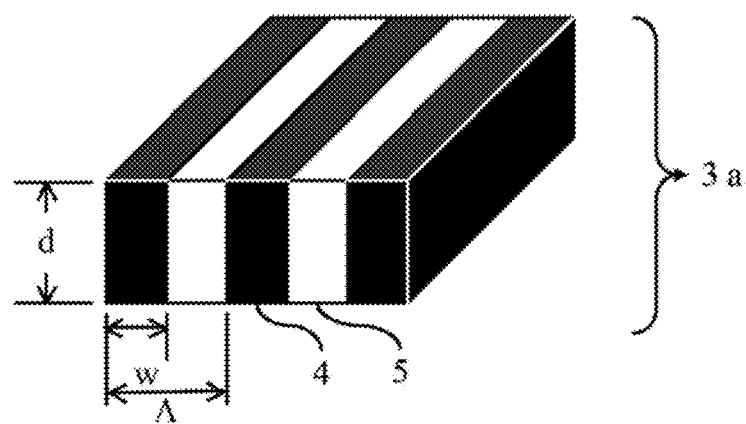
FIG. 2 shows a structure of a wire grid in a polarization beam splitting part of the polarization beam splitting element shown in FIG. 1.

FIG. 2 schematically shows a structure of a wire grid 3a of the polarization beam splitting part 3 in the polarization beam splitting element 10 of this embodiment. The wire grid 3a has a one-dimensional grating structure in which grating portions (hereinafter referred to as "metal grating portions") 4 formed of a metal and inter-metal grating portions 5 each disposed between the metal grating portions 4 are alternately disposed. Parameters deciding polarization characteristics of the wire grid 3a are a grating thickness d, a width (hereinafter referred to as "a grating width") w of the metal grating portion 4 and a filling factor FF representing a ratio w/Λ of the grating width w to the grating period (grating pitch) Λ of the metal grating portion 4. The wire grid 3a (metal grating portions 4) has the grating period Λ sufficiently smaller than the wavelength of the entering beam (use wavelength).

Figure 3:
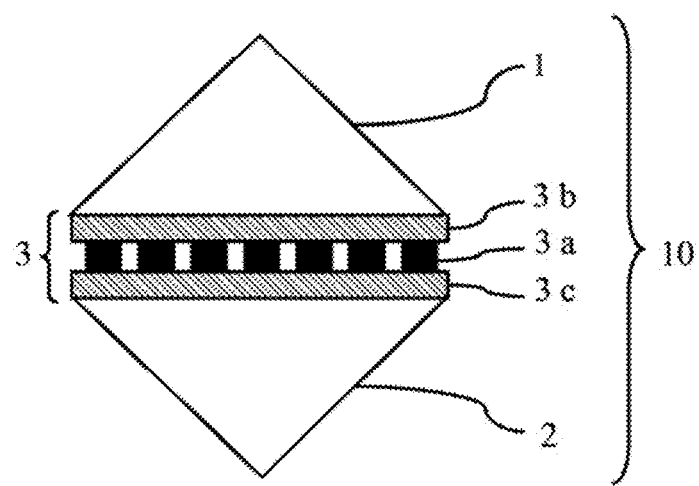
FIG. 3 shows a configuration of a polarization beam splitting element that is Embodiment 1 of the present invention.
Figure 4:
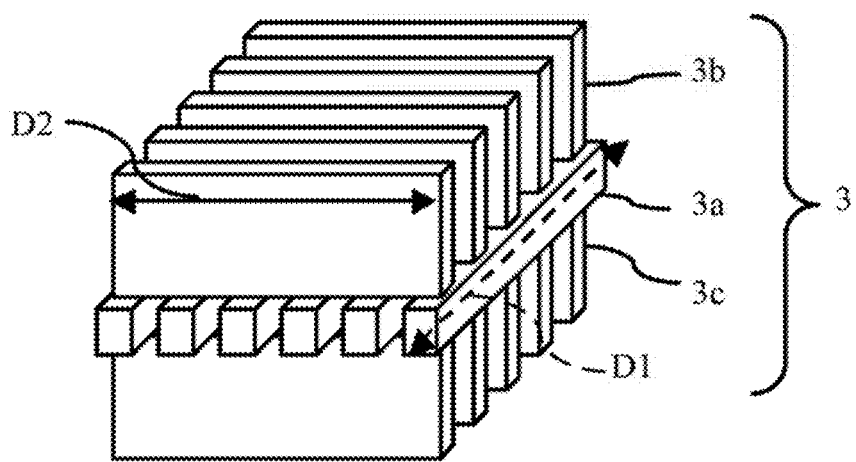
FIG. 4 shows a configuration of a polarization beam splitting part of the polarization beam splitting element of Embodiment 1.

FIG. 3 shows a more detailed configuration of the polarization beam splitting element 10 shown in FIG. 1. FIG. 4 shows a configuration of the polarization beam splitting part 3 of the polarization beam splitting element 10 shown in FIG. 3. FIGS. 3 and 4 exaggeratingly show structures of the wire grid 3a and dielectric grids 3b and 3c described later for easy understanding of the configuration of the polarization beam splitting part 3, and thus an actual size relationship between the prisms 1 and 2 and the polarization beam splitting part 3 is different from that shown in FIGS. 3 and 4.

The polarization beam splitting part 3 disposed between the prisms 1 and 2 is constituted by laminating the wire grid 3a shown in FIG. 2 and a dielectric grid 3b (3c) disposed on one side (beam entrance side) of the wire grid 3a in a direction of the grating thickness (hereinafter referred to as "a grating thickness direction") or both side (beam entrance side and transmitted beam exit side) thereof. In other words, the polarization beam splitting element 10 includes, in order from the beam entrance side toward the transmitted beam exit side, at least the prism 1, the dielectric grid (first one-dimensional grating structure) 3b and the wire grid (second one-dimensional grating structure) 3a, and also includes the dielectric grid 3c and the prism 2 as needed.

The dielectric grid 3b (3c) has a one-dimensional grating structure in which grating portions (hereinafter referred to as "dielectric grating portions") formed of a dielectric material and inter-dielectric grating portions each disposed between the dielectric grating portions are alternately disposed. The dielectric grid 3b (3c) has a longitudinal direction D2 (shown by a solid arrow in FIG. 4) of the dielectric grating portions, which is orthogonal to a longitudinal direction D1 (shown by a dashed arrow in FIG. 4) of the metal grating portions 4 of the wire grid 3a. In other words, the dielectric grating portions have a first grating period in the direction D1 that is a first direction corresponding to a width direction of the dielectric grating portion, and the metal grating portions 4 have a second grating period in the direction D2 that is a second direction corresponding to a width direction of the metal grating portion 4 and being orthogonal to the first direction D1.

The grating period (first grating period) of the dielectric grating portions of the dielectric grid 3b may be same as or different from the grating period (second grating period) of the metal grating portions 4 of the wire grid 3a. When the two dielectric grids 3b and 3c are provided, the grating periods thereof may be mutually same or different.

The term "orthogonal" used in this embodiment means not only a state of being perfectly orthogonal, but also a state of being shifted from the perfectly orthogonal state within a permissible range. Similarly, the term "parallel" used in this embodiment means not only a state of being perfectly parallel, but also a state of being shifted from the perfectly parallel state within a permissible range.

The metal grating portion 4 of the wire grid 3a is formed of a metal such as aluminum, silver, gold, nickel, chrome, copper, platinum or tungsten. The dielectric grating portion of the dielectric grids 3b and 3c is formed of a dielectric material such as $MgF_2$, $SiO_2$, $TiO_2$, $Al_2O_3$, $ZrO_2$, $Ta_2O_5$ or $Nb_2O_3$.

The wire grid 3a is disposed such that the longitudinal direction (first direction D1) of the metal grating portions 4 is parallel to a direction orthogonal to the entrance plane corresponding to a paper plane of FIG. 3, that is, such that the first direction D1 is parallel to a normal direction of the entrance plane. In other words, the wire grid 3a is disposed such that the second direction D2 that is a grating period direction of the metal grating portions 4 is parallel to the entrance plane.

Such disposition of the wire grid 3a makes it possible to provide, to the wire grid 3a, a function of transmitting entering p-polarized light and reflecting entering s-polarized light. In all of embodiments and comparative examples described later, the longitudinal direction of the metal grating portions 4 of the wire grid 3a is orthogonal to the entrance plane (that is, parallel to the normal direction to the entrance plane).

In this embodiment, an effective refractive index of the dielectric grid 3b for the p-polarized light as the first polarized light whose polarization direction is parallel to the second direction that is the longitudinal direction of the dielectric grid 3b (dielectric grating portions), that is, whose polarization direction is orthogonal to the first direction, or whose polarization direction is parallel to the entrance plane, is represented by $n_{TE}$. Moreover, an effective refractive index of the dielectric grid 3b for the s-polarized light as the second polarized light whose polarization direction is orthogonal to the second direction that is the longitudinal direction of the dielectric grid 3b, that is, whose polarization direction is parallel to the first direction, or whose polarization direction is orthogonal to the entrance plane, is represented by $n_{TM}$. These effective refractive indices $n_{TE}$ and $n_{TM}$ are calculated by the following expressions (1) and (2) where $n_1$ represents a refractive index of the dielectric grating portion, $n_2$ represents a refractive index of the inter-dielectric grating portion, and a filling factor FF defined by a ratio w/Λ of the grating width w of the dielectric grating portion to the grating period Λ thereof.

$$n_{TE} = \{FF \times n_1^2 + (1-FF) \times n_2^2\}^{1/2} \quad (1)$$

$$1/n_{TM} = \{F \times 1/n_1^2 + (1-FF) \times 1/n_2^2\}^{-1/2} \quad (2)$$

In order to suppress reflection of the p-polarized light at the interface between the prism 1 and the dielectric grid 3b, it is desirable that the effective refractive index $n_{TE}$ of the dielectric grid 3b for the p-polarized light and a refractive index $n_p$ of the prism 1 satisfy the following condition (3):

$$0.9 < n_{TE}/n_p < 1.1 \quad (3)$$

The satisfaction of the condition (3) enables reduction of a refractive index difference between the prism 1 and the dielectric grid 3b for the p-polarized light, which enables the suppression of the reflection of the p-polarized light at the interface between the prism 1 and the dielectric grid 3b. A value of $n_{TE}/n_p$ smaller than the lower limit of the condition (3) and a value of $n_{TE}/n_p$ larger than the upper limit thereof make the refractive index difference between the prism 1 and the dielectric grid 3b for the p-polarized light too large and thereby increase the reflection at the interface therebetween, which makes it difficult to provide good characteristics for the p-polarized light.

Figure 5:
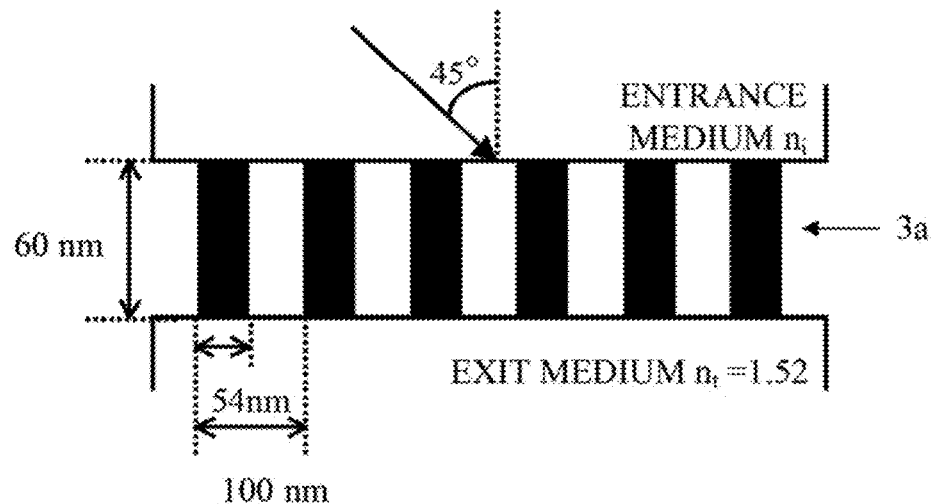
FIG. 5 shows a structure of a wire grid in the polarization beam splitting part in Embodiment 1.
Figure 6:
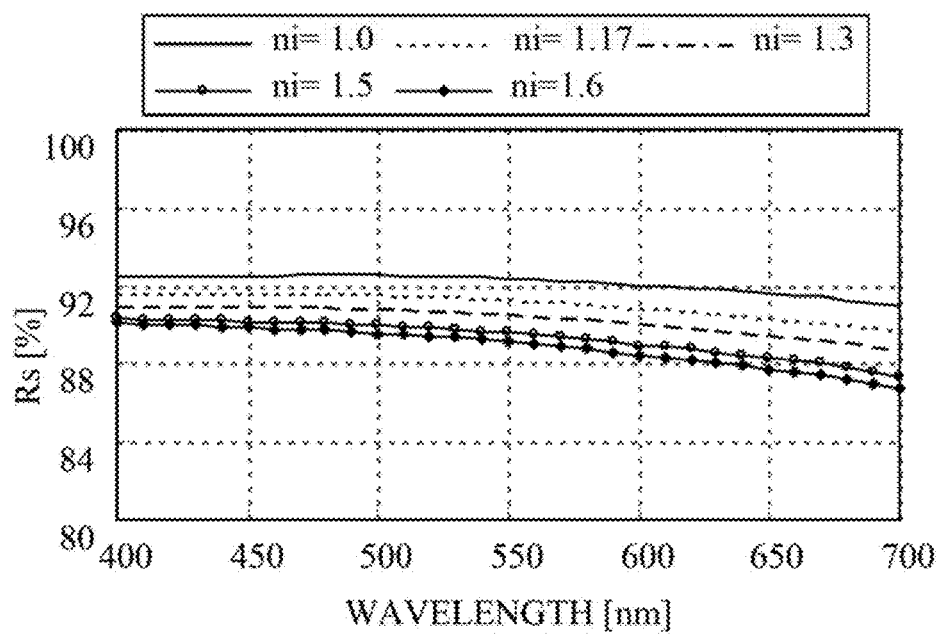
FIG. 6 shows wavelength characteristics of s-polarized light reflectance of the wire grid for various refractive indices of an entrance medium.

FIG. 6 shows wavelength characteristics of reflectance for the s-polarized light (s-polarized light reflectance) of the wire grid 3a for various refractive indices $n_i$ of an entrance medium when a ray transmitted through the entrance medium enters the wire grid 3a at an incident angle of 45° (degrees) as shown in FIG. 5. The entrance medium is a medium existing on the beam entrance side further than the wire grid 3a.

In the wavelength characteristics, the metal grating portion of the wire grid 3a is formed of aluminum and has a grating thickness of 60 nm, a grating period of 100 nm and a grating width of 54 nm. A refractive index $n_t$ of an exit medium that is a medium existing on the transmitted beam exit side further than the wire grid 3a is 1.52. The refractive indices $n_i$ of the entrance medium are set to 1.0, 1.17, 1.3, 1.5 and 1.6.

As understood from FIG. 6, the s-polarized light reflectance Rs of the wire grid 3a increases as the refractive index $n_i$ of the entrance medium decreases, and has good wavelength characteristics.

In the dielectric grid, since $n_{TE}$ is larger than $n_{TM}$ ($n_{TE} > n_{TM}$), in order to provide good characteristics for the s-polarized light, it is desirable that the longitudinal direction of the dielectric grid be orthogonal to the longitudinal direction of the wire grid 3a.

Moreover, it is desirable that the refractive index $n_p$ of the prism 1 and the effective refractive index $n_{TM}$ of the dielectric grid 3b for the s-polarized light satisfy the following condition (4). The satisfaction of the condition (4) provides an improved reflectance characteristic for the s-polarized light as compared with a case where the wire grid 3a is adjacent to the prism 1.

$$n_p > n_{TM} \quad (4)$$

In addition, it is desirable that the grating thickness d[nm] of the dielectric grid 3b, the effective refractive index $n_{TM}$ of the dielectric grid 3b for the s-polarized light, a central wavelength λ of the entering beam and an angle θ[°:deg] formed by a ray included in the entering beam with the normal to the interface between the prism 1 and the dielectric grid 3b satisfy the following condition (5). The satisfaction of the condition (5) provides a more effectively improved reflectance characteristic for the s-polarized light.

$$0.2 < (n_{TM} \times \cos\theta) d/\lambda < 0.3 \quad (5)$$

A large grating thickness d causing the value of $(n_{TM} \times \cos\theta)d/\lambda$ to exceed the upper limit of the condition (5) increases a ratio of the grating thickness to the grating width, which excessively decreases strength of the dielectric grid 3b and also makes manufacturing thereof difficult. On the other hand, a small grating thickness d causing the value of $(n_{TM} \times \cos\theta)d/\lambda$ to fall below the lower limit of the condition (5) reduces changes of the reflectance and transmittance, which makes it impossible to provide sufficient performance. Thus, it is desirable for effective reflection of the s-polarized light to satisfy the condition (5).

A simple configuration of the polarization beam splitting part 3 including only the wire grid 3a and the dielectric grid 3b makes design and manufacturing of the polarization beam splitting part 3 easy. However, the polarization beam splitting part 3 may be constituted by the wire grid 3a and the dielectric grids 3b and 3c sandwiching the wire grid 3a. In particular, providing a same structure to the dielectric grids 3b and 3c makes optical characteristics for the p-polarized light and the s-polarized light equal to each other both when the entering beam enters from the prism 1 and when it enters from the prism 2, which reduces restrictions on a configuration of an optical system using the polarization beam splitting element 10 and thereby enables use of polarization beam splitting element 10 for optical systems having various configurations.

Moreover, if the grating thickness of the wire grid 3a is fixed, transmittance for the s-polarized light (s-polarized light transmittance) of the wire grid 3a increases as the grating period thereof increases, which deteriorates a polarization splitting characteristic of the polarization beam splitting element 10. Furthermore, a larger grating period than 120 nm significantly deteriorates a p-polarized light reflectance characteristic in a short wavelength range up to about 500 nm. In particular, a larger grating period than 150 nm generates diffraction depending on incident angle, which makes it impossible to provide a good polarization splitting characteristic.

Accordingly, it is desirable that the grating period of the wire grid 3a be 150 nm or less, and it is more desirable for providing a good polarization splitting characteristic in the short wavelength range that the grating period be 120 nm or less.

Moreover, a large grating thickness generates absorption or reflection of the p-polarized light to be transmitted, which makes it hard to provide a sufficient transmittance characteristic. In addition, an increased ratio of the grating thickness to the grating width decreases the strength of the wire grid 3a and also makes manufacturing thereof difficult. Thus, it is desirable that the grating thickness of the wire grid 3a be 100 nm or less.

Furthermore, when an angle formed by the beam entrance surface of the prism 1 with the interface between the prism 1 and the polarization beam splitting part 3 is about 45°, it is desirable that the filling factor FF of the wire grid 3a satisfy the following condition (6):

$$A(\Lambda/\lambda)^2 + B(\Lambda/\lambda) + 0.73 < FF < A(\Lambda/\lambda)^2 + B(\Lambda/\lambda) + 0.90 \quad (6)$$

where A represents 3.5, B represents −2.1, Λ[nm] represents the grating period (second grating period) of the wire grid 3a, w[nm] represents the grating width of the wire grid 3a, the filling factor FF is defined by w/Λ, and λ[nm] represents the central wavelength of the entering beam.

In order to ensure a good polarization splitting characteristic, it is necessary that the s-polarized light transmittance be sufficiently low. However, the s-polarized light transmittance is largely dependent on the grating thickness of the wire grid 3a. Therefore, the grating thickness of the wire grid 3a for ensuring a good polarization splitting characteristic is almost decided based on specifications required to the polarization beam splitting element 10.

On the other hand, in order to lower the p-polarized light reflectance at an optimum incident angle, it is necessary to optimize the grating thickness and filling factor FF of the wire grid 3a according to the refractive index of the prism. The inventor found that the filling factor FF of the wire grid 3a satisfying the condition (6) makes it possible to optimize the p-polarized light reflectance characteristic (that is, to sufficiently reduce the p-polarized light reflectance) with a grating thickness that can sufficiently suppress the s-polarized light transmittance.

A smaller filling factor FF than the lower limit of the condition (6) makes it necessary to further reduce the grating thickness in order to suppress the p-polarized light reflectance, which makes it difficult to sufficiently reduce the s-polarized light transmittance. On the other hand, a larger filling factor FF than the upper limit of the condition (6) makes it necessary to further increase the grating thickness in order to suppress the p-polarized light reflectance, which increases absorption loss of the p-polarized light though the s-polarized light transmittance becomes sufficiently low, and thereby makes it impossible to provide sufficiently high p-polarized light transmittance. Accordingly, in order to provide good characteristics for both the p-polarized light and s-polarized light, it is desirable to satisfy the condition (6).

Description will hereinafter be made of the specific embodiments.

[Embodiment 1]

Figure 7:
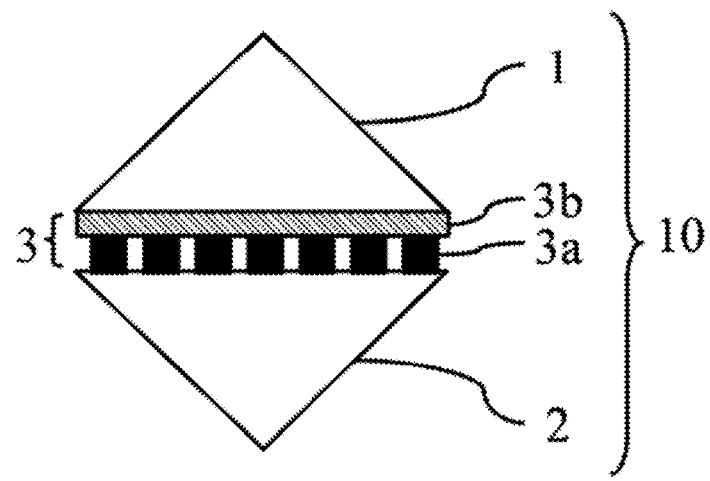
FIG. 7 shows a configuration of a polarization beam splitting element that is Embodiment 2 of the present invention.
Figure 8:
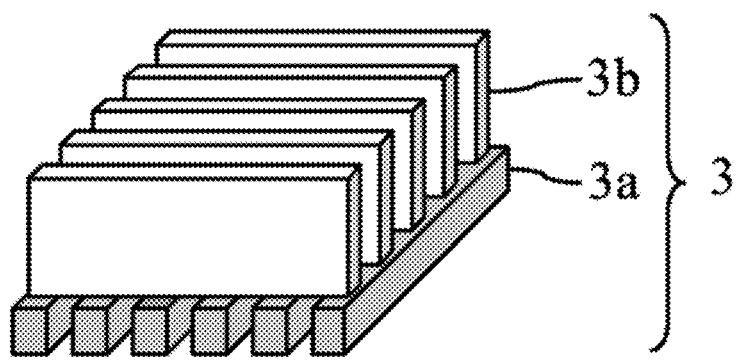
FIG. 8 shows a configuration of a polarization beam splitting part of the polarization beam splitting element of Embodiment 2.

FIG. 7 shows a configuration of a polarization beam splitting element 10 that is a first embodiment (Embodiment 1) of the present invention. FIG. 8 shows a configuration of a polarization beam splitting part 3 of the polarization beam splitting element 10 of this embodiment. The polarization beam splitting element 10 of this embodiment is constituted by, in order from a beam entrance side toward a transmitted beam exit side, a prism 1, a dielectric grid 3b, a wire grid 3a and a prism 2.

The prisms 1 and 2 have a refractive index n of 1.6. The dielectric grid 3b (dielectric grating portion) is formed of a dielectric material whose refractive index n of 2.32. The wire grid 3a (metal grating portion 4) is formed of aluminum. The dielectric grid 3b has a filling factor of 0.335 and a grating thickness of 165.8 nm. The wire grid 3a has a filling factor FF of 0.55 and a grating thickness of 60 nm. The dielectric grid 3b and the wire grid 3a both have a grating period Λ of 100 nm.

Figure 9A:
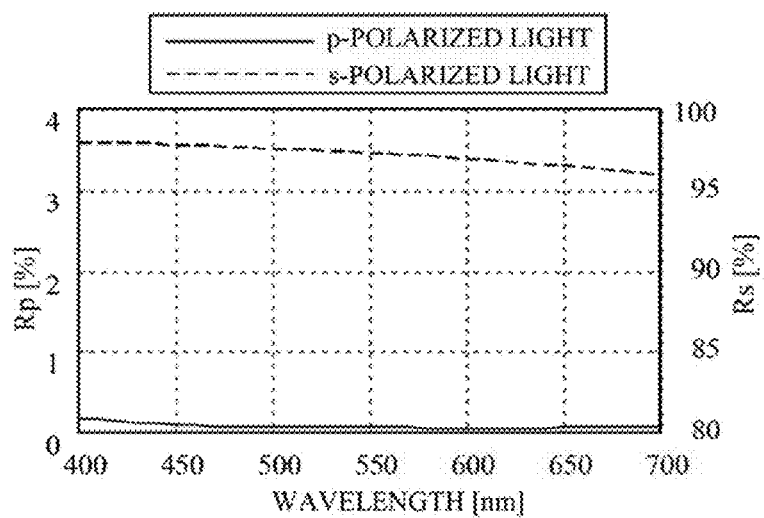
FIG. 9A shows wavelength characteristics of p-polarized light reflectance and s-polarized light reflectance of the polarization beam splitting element of Embodiment 1.
Figure 9B:
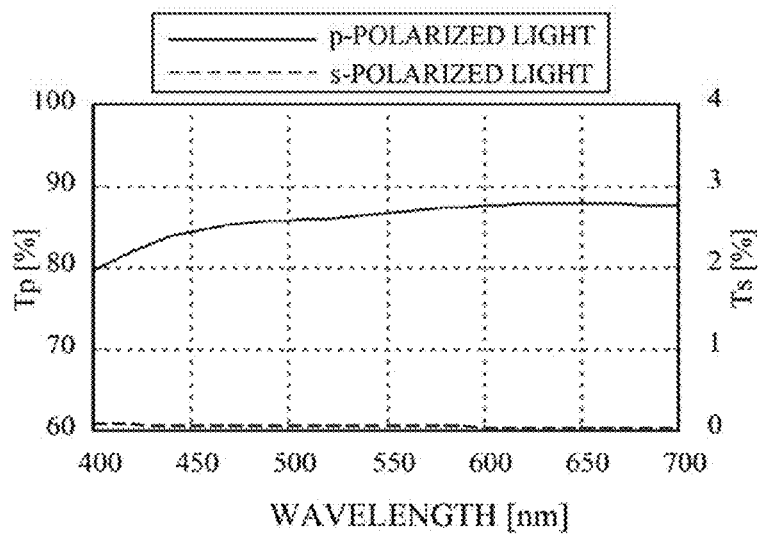
FIG. 9B shows wavelength characteristics of p-polarized light transmittance and s-polarized light transmittance of the polarization beam splitting element of Embodiment 1.

FIGS. 9A and 9B respectively show reflectance and transmittance of the polarization beam splitting part 3 for beams having various wavelengths and perpendicularly entering a beam entrance surface of the prism 1. In FIGS. 9A and 9B, solid lines and first axes (left axes) show reflectance Rp for p-polarized light (p-polarized light reflectance) and transmittance Tp for the p-polarized light (p-polarized light transmittance), and dashed lines and second axes (right axes) show reflectance Rs for s-polarized light (s-polarized light reflectance) and transmittance Ts for the s-polarized light (s-polarized light transmittance).

As understood from FIGS. 9A and 9B, this embodiment provides Rs>96%, Ts<0.09%, Rp<0.13% in a wavelength range of 400 nm (or 430 nm)-700 nm, which shows excellent characteristics.

Figure 10A:
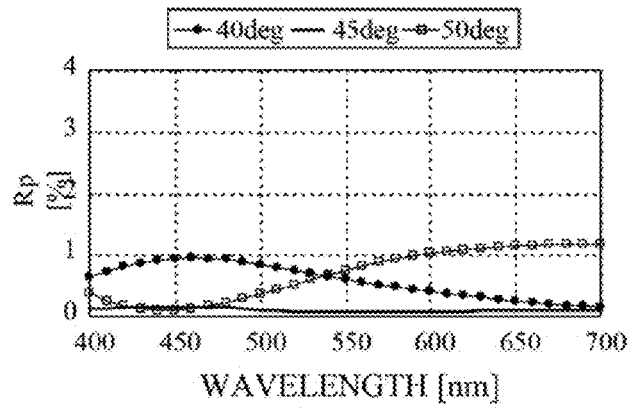
FIGS. 10A to 10D show wavelength characteristics of p-polarized reflectance, p-polarized light transmittance, s-polarized light reflectance and s-polarized light transmittance of the polarization beam splitting element of Embodiment 1.
Figure 10B:
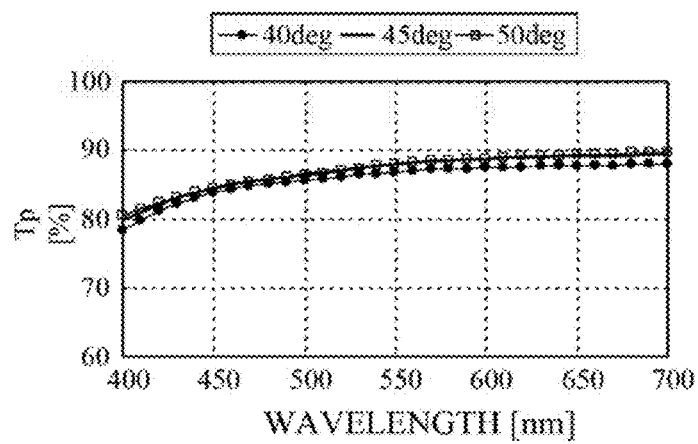
Figure 10C:
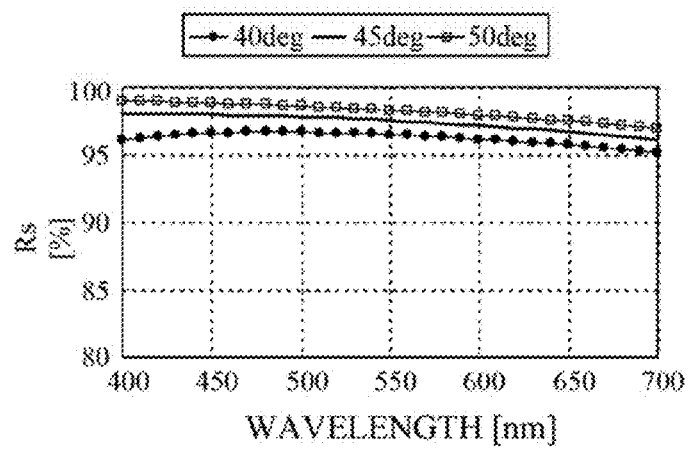
Figure 10D:
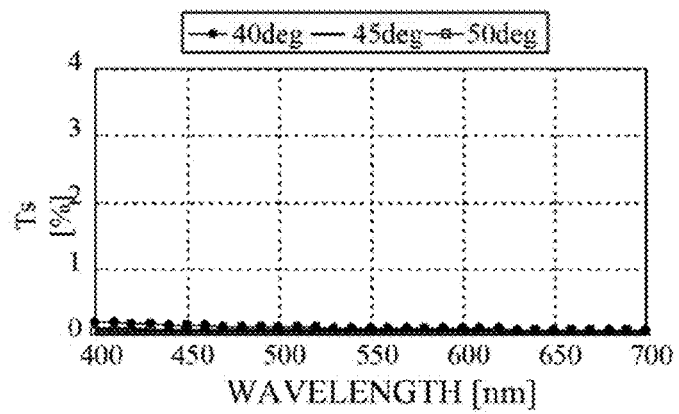

FIGS. 10A and 10B show p-polarized light reflectance Rp and p-polarized light transmittance Tp of the polarization beam splitting part 3 for angles (incident angles) of 40°, 45° and 50° formed by an entering ray with a normal to an interface between the prism 1 and the polarization beam splitting part 3. FIGS. 10C and 10D show s-polarized light reflectance Rs and s-polarized light transmittance Ts of the polarization beam splitting part 3 for the above incident angles of 40°, 45° and 50°. This embodiment uses no total reflection for reflection of the s-polarized light, which decreases incident angle dependency and thereby provides good characteristics in a wide incident angle range, as compared with the polarization beam splitting element constituted only by a dielectric grid and disclosed in Japanese Patent Laid Open No. 2005-321562.

COMPARATIVE EXAMPLE 1

Description will be made of a first comparative example (Comparative Example 1) with respect to Embodiment 1. A polarization beam splitting element of this comparative example is constituted by two prisms and a polarization beam splitting part disposed between these prisms, as well as Embodiment 1. However, the polarization beam splitting part is constituted only by a wire grid. This comparative example has a same refractive index of the prisms and same parameters of the wire grid as those of Embodiment 1.

Figure 18A:
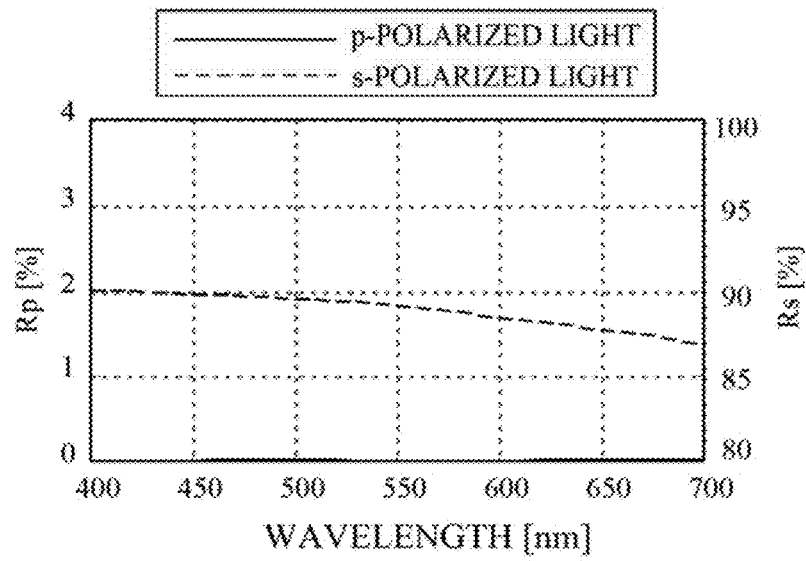
FIG. 18A shows wavelength characteristics of p-polarized light reflectance and s-polarized light reflectance of a polarization beam splitting element that is Comparative Example 1.
Figure 18B:
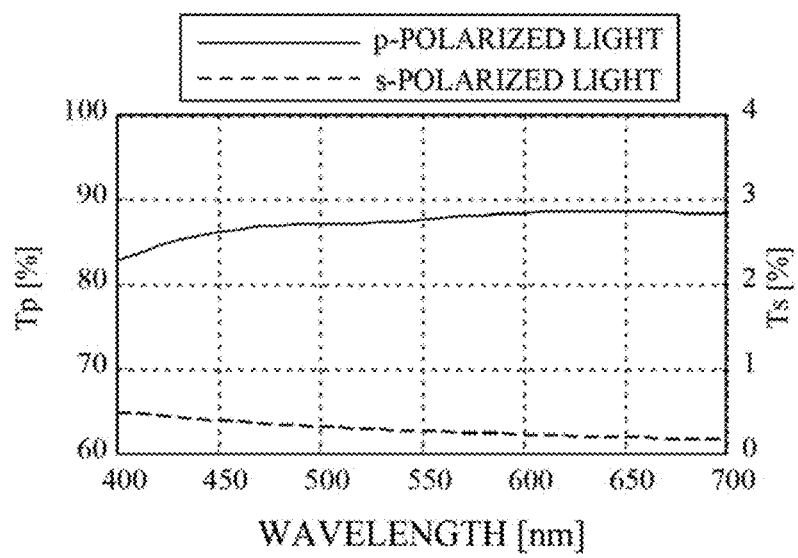
FIG. 18B shows wavelength characteristics of p-polarized light transmittance and s-polarized light transmittance of the polarization beam splitting element of Comparative Example 1.

FIGS. 18A and 18B respectively show reflectance and transmittance of the polarization beam splitting part in this comparative example for beams having various wavelengths and perpendicularly entering a beam entrance surface of the prism. As understood from comparison of the reflectance and the transmittance shown in FIGS. 18A and 18B with those shown in FIGS. 9A and 9B in Embodiment 1, this comparative example provides a similar Tp, but a lower Rs by about 10%. Moreover, this comparative example provides a high Ts of 0.19-0.45% that is three times or more of Ts of Embodiment 1 in which the dielectric grid 3b is provided, which shows significant deterioration of the polarization splitting characteristic.

As described above, the polarization beam splitting part constituted only by the wire grid makes it difficult to realize a polarization beam splitting element providing, as the polarization beam splitting element of Embodiment 1, high s-polarized light reflectance Rs and low s-polarized light transmittance Ts.

[Embodiment 2]

Next, description will be made of a polarization beam splitting element that is a second embodiment (Embodiment 2) of the present invention. The polarization beam splitting element of Embodiment 2 is constituted by, as well as the polarization beam splitting element of Embodiment 1 shown in FIGS. 7 and 8, in order from a beam entrance side toward a transmitted beam exit side, a prism 1, a dielectric grid 3b, a wire grid 3a and a prism 2.

The prisms 1 and 2 have a same refractive index as that of Embodiment 1, and the dielectric grid 3b has same refractive index, filling factor and grating thickness as those of Embodiment 1. However, the dielectric grid 3b and the wire grid 3a both have a grating period Λ of 120 nm, and the wire grid 3a has a filling factor FF of 0.54 and a grating thickness of 70 nm.

Figure 11A:
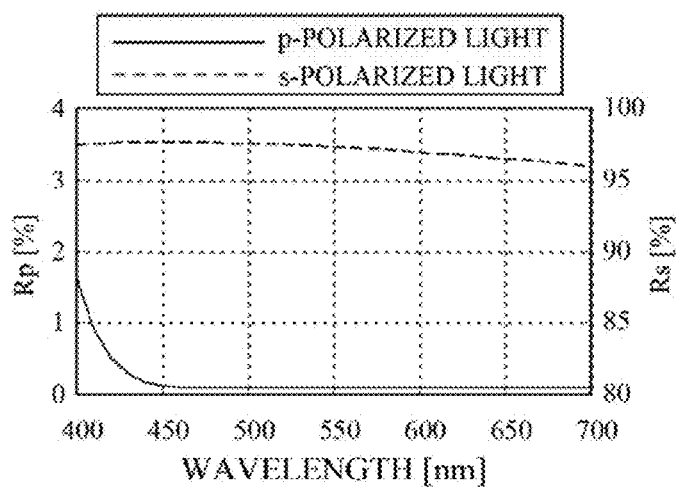
FIG. 11A shows wavelength characteristics of p-polarized light reflectance and s-polarized light reflectance of the polarization beam splitting element of Embodiment 2.
Figure 11B:
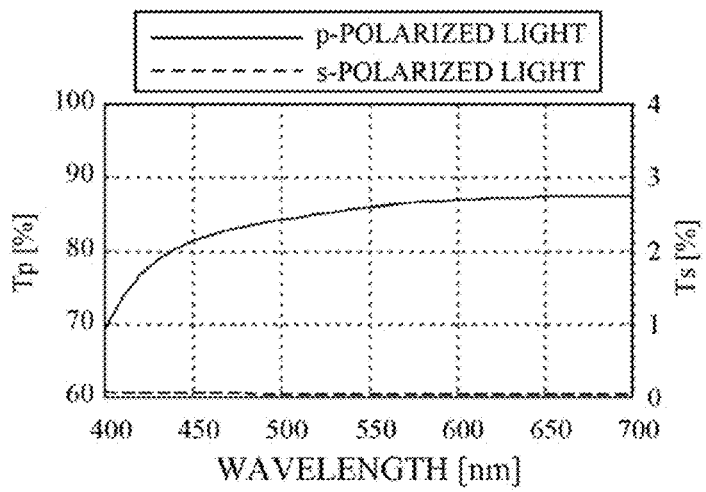
FIG. 11B shows wavelength characteristics of p-polarized light transmittance and s-polarized light transmittance of the polarization beam splitting element of Embodiment 2.

FIGS. 11A and 11B respectively show reflectance and transmittance of the polarization beam splitting part 3 for beams having various wavelengths and perpendicularly entering a beam entrance surface of the prism 1. In FIGS. 11A and 11B, solid lines and first axes show p-polarized light reflectance Rp and p-polarized light transmittance Tp, and dashed lines and second axes show s-polarized light reflectance Rs and s-polarized light transmittance Ts.

As understood from FIGS. 11A and 11B, this embodiment provides Rs>96%, Ts<0.08%, Rp<0.3% (430 nm-700 nm) in a wavelength range of 400 nm (or 430 nm)-700 nm, which shows excellent characteristics.

This embodiment provides slightly deteriorated reflectance and transmittance for the p-polarized light in a short wavelength range, as compared with Embodiment 1. However, this embodiment can be more easily manufactured than Embodiment 1 because of a larger grating period than that of Embodiment 1.

COMPARATIVE EXAMPLE 2

Description will be made of a second comparative example (Comparative Example 2) with respect to Embodiment 2. A polarization beam splitting element of this comparative example is constituted by, as well as Embodiment 2, two prisms and a polarization beam splitting part constituted by a dielectric grid and a wire grid and disposed between these prisms. This comparative example has a same refractive index of the prisms and same refractive index, filling factor and grating thickness of the dielectric grid as those of Embodiments 1 and 2. However, the dielectric grid and the wire grid both have a grating period of 150 nm, and the wire grid has a filling factor FF of 0.54 and a grating thickness of 80 nm.

Figure 19A:
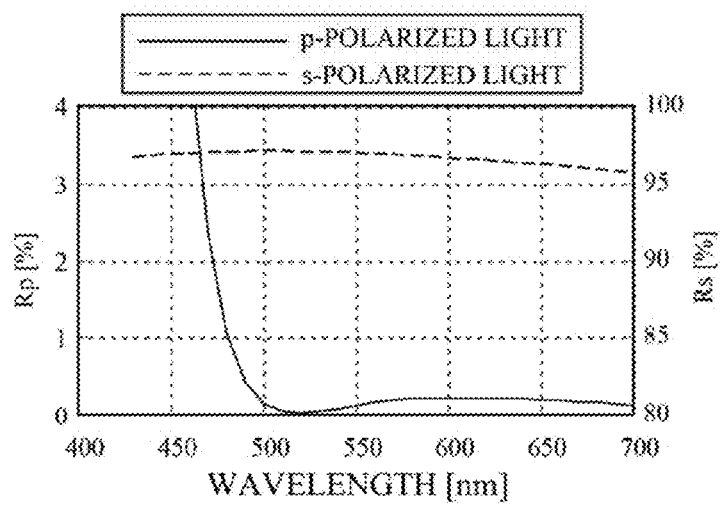
FIG. 19A shows wavelength characteristics of p-polarized light reflectance and s-polarized light reflectance of a polarization beam splitting element that is Comparative Example 2.
Figure 19B:
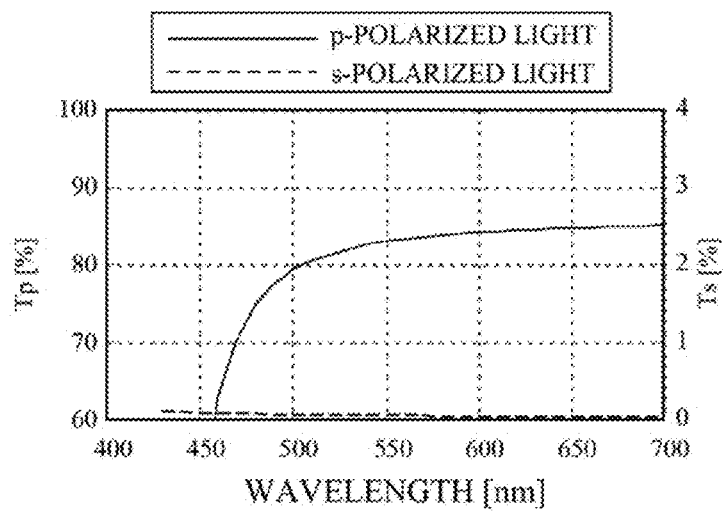
FIG. 19B shows wavelength characteristics of p-polarized light transmittance and s-polarized light transmittance of the polarization beam splitting element of Comparative Example 2.

FIGS. 19A and 19B respectively show reflectance and transmittance of the polarization beam splitting part in this comparative example for beams having various wavelengths and perpendicularly entering a beam entrance surface of the prism. However, diffraction is generated in a wavelength range shorter than 420 nm, so that these figures show the reflectance and the transmittance in a wavelength range of 430 nm-700 nm.

An excessively large grating period employed in this comparative example is not a sufficiently smaller grating period than a short side wavelength in the use wavelength (430 nm-700 nm), so that the polarization beam splitting part provides a function of a diffraction grating, which makes impossible to provide an original polarization splitting function.

Moreover, an excessively large grating period tends to provide high s-polarized light transmittance, which makes it necessary to increase the grating thickness of the wire grid, as this comparative example, in order to sufficiently reduce the s-polarized light transmittance. Moreover, also in a wavelength range where no diffraction is generated, the characteristics for the p-polarized light are significantly deteriorated: undesirable characteristics such as Rp>4.5% and Tp<65% are provided in a wavelength range of 460 nm or less.

Thus, such a large grating period (larger than 150 nm) makes it difficult to realize a polarization beam splitting element providing good p-polarized light characteristics in the entire visible wavelength range.

[Embodiment 3]

Figure 12:
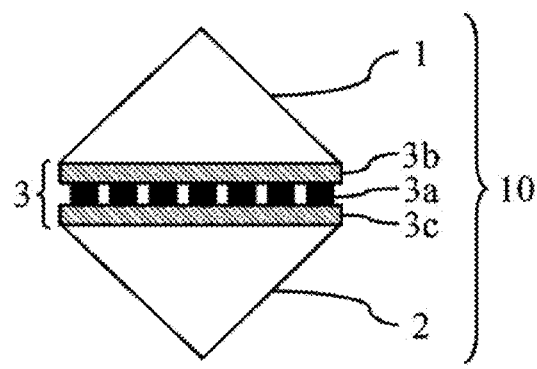
FIG. 12 shows a configuration of a polarization beam splitting part of the polarization beam splitting element of Embodiment 3.
Figure 13:
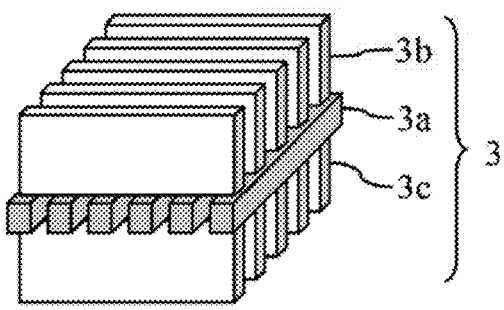
FIG. 13 shows a configuration of a polarization beam splitting part of the polarization beam splitting element of Embodiment 3.

FIG. 12 shows a configuration of a polarization beam splitting element 10 that is a third embodiment (Embodiment 3) of the present invention. FIG. 13 shows a configuration of a polarization beam splitting part 3 of the polarization beam splitting element 10 of this embodiment. The polarization beam splitting element 10 of this embodiment is constituted by, in order from a beam entrance side toward a transmitted beam exit side, a prism 1, a dielectric grid 3b, a wire grid 3a, a dielectric grid 3c and a prism 2. The dielectric grids 3b and 3c have a mutually same structure.

The prisms 1 and 2 have a refractive index n of 1.52. The dielectric grids 3b and 3c (dielectric grating portions) are formed of a dielectric material whose refractive index n of 2.32. The wire grid 3a (metal grating portion 4) is formed of aluminum. The dielectric grids 3b and 3c have a filling factor of 0.30 and a grating thickness of 169 nm. The wire grid 3a has a filling factor FF of 0.535 and a grating thickness of 60 nm. The dielectric grids 3b and 3c and the wire grid 3a have a grating period Λ of 100 nm.

Figure 14A:
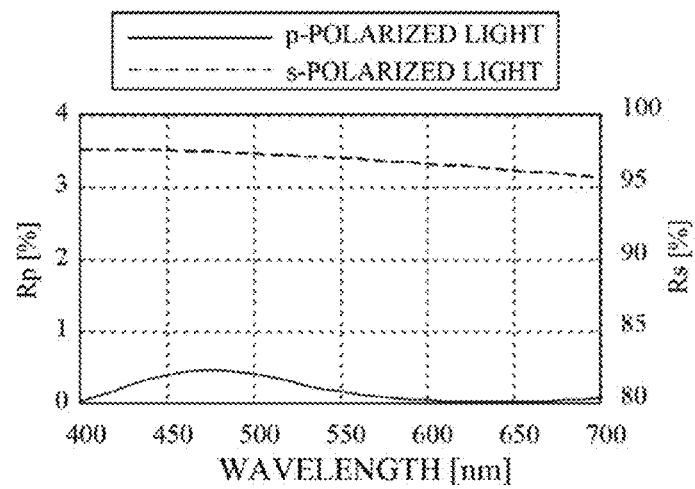
FIG. 14A shows wavelength characteristics of p-polarized light reflectance and s-polarized light reflectance of the polarization beam splitting element of Embodiment 3.
Figure 14B:
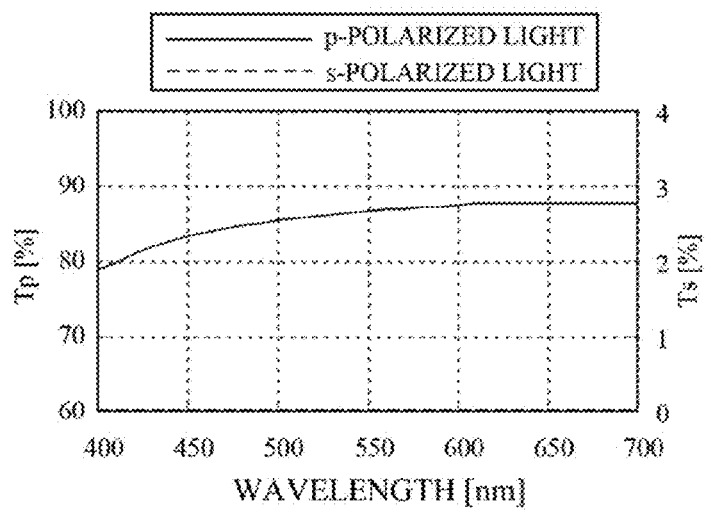
FIG. 14B shows wavelength characteristics of p-polarized light transmittance and s-polarized light transmittance of the polarization beam splitting element of Embodiment 3.

FIGS. 14A and 14B respectively show reflectance and transmittance of the polarization beam splitting part 3 for beams having various wavelengths and perpendicularly entering a beam entrance surface of the prism 1. In FIGS. 14A and 14B, solid lines and first axes show p-polarized light reflectance Rp and p-polarized light transmittance Tp, and dashed lines and second axes show s-polarized light reflectance Rs and s-polarized light transmittance Ts.

As understood from FIGS. 14A and 14B, this embodiment provides Rs>95%, Ts<0.03%, Rp<0.5% in a wavelength range of 400 nm (or 430 nm)-700 nm, which shows excellent characteristics.

This embodiment has mutually same characteristics for the s-polarized light and the p-polarized light both when the entering beam enters from the prism 1 and when it enters from the prism 2, which makes it possible to use this embodiment as a polarization beam splitting element for various optical systems, as described above.

[Embodiment 4]

Next, description will be made of a polarization beam splitting element that is a fourth embodiment (Embodiment 4) of the present invention. The polarization beam splitting element of Embodiment 4 is constituted by, as well as the polarization beam splitting element of Embodiment 1 (and Embodiment 2) shown in FIGS. 7 and 8, in order from a beam entrance side toward a transmitted beam exit side, a prism 1, a dielectric grid 3b, a wire grid 3a and a prism 2.

The prisms 1 and 2 have a refractive index n of 1.8. The dielectric grid 3b (dielectric grating portion) is formed of a dielectric material whose refractive index n of 2.32. The wire grid 3a (metal grating portion 4) is formed of aluminum. The dielectric grid 3b has a filling factor of 0.51 and a grating thickness of 148.6 nm. The wire grid 3a has a filling factor FF of 0.58 and a grating thickness of 60 nm. The dielectric grid 3b and the wire grid 3a both have a grating period Λ of 100 nm.

Figure 15A:
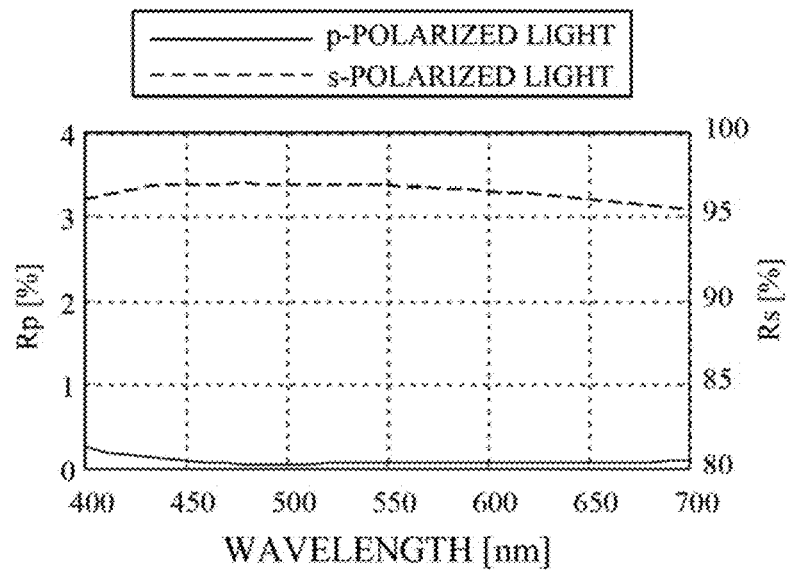
FIG. 15A shows wavelength characteristics of p-polarized light reflectance and s-polarized light reflectance of a polarization beam splitting element that is Embodiment 4 of the present invention.
Figure 15B:
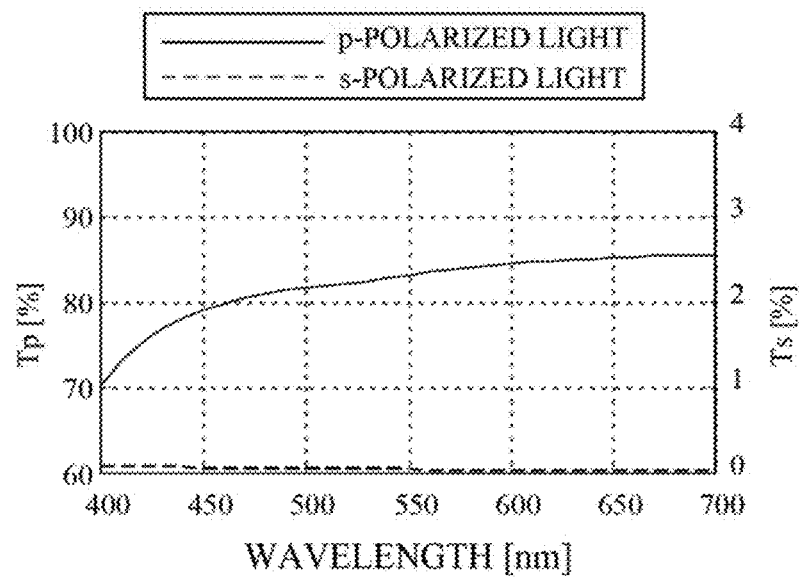
FIG. 15B shows wavelength characteristics of p-polarized light transmittance and s-polarized light transmittance of the polarization beam splitting element of Embodiment 4.

FIGS. 15A and 15B respectively show reflectance and transmittance of the polarization beam splitting part 3 for beams having various wavelengths and perpendicularly entering a beam entrance surface of the prism 1. In FIGS. 15A and 15B, solid lines and first axes show p-polarized light reflectance Rp and p-polarized light transmittance Tp, and dashed lines and second axes show s-polarized light reflectance Rs and s-polarized light transmittance Ts. In this embodiment, the prisms 1 and 2 have a high refractive index of 1.8, which generally tends to deteriorate a polarization splitting characteristic as compared with the case where an entrance medium is formed by air or formed as a vacuum space. However, as understood from FIGS. 15A and 15B, this embodiment provides Rs>95%, Ts<0.09%, Rp<0.15% (430 nm-700 nm) in a wavelength range of 400 nm (or 430 nm)-700 nm, which shows excellent characteristics.

[Embodiment 5]

Figure 16:
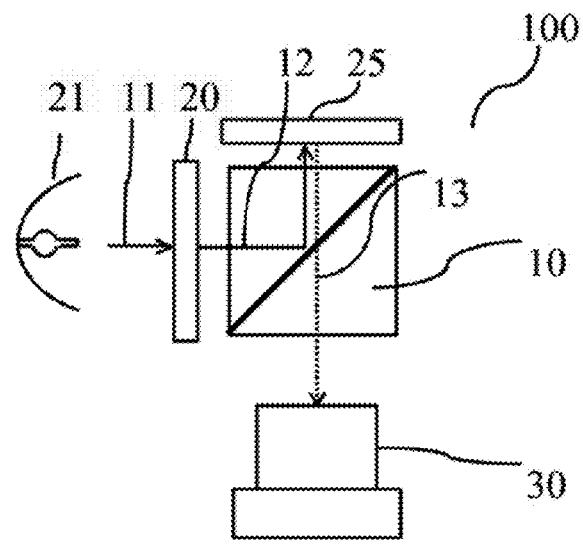
FIG. 16 shows a configuration of a liquid crystal projector that is Embodiment 5 of the present invention.

FIG. 16 shows a configuration of a liquid crystal projector (image projection apparatus) that is a fifth embodiment of the present invention, the projector using any one of the polarization beam splitting elements 10 of Embodiments 1 to 4. The liquid crystal projector 100 includes a light source lamp 21, a polarization conversion element 20, a polarization beam splitter 10 as the polarization beam splitting element 10 described in any one of Embodiments 1 to 4, a reflective liquid crystal panel 25 as a light modulation element and a projection lens (projection optical system) 30.

White light emitted from the light source lamp 21 is converted into a collimated light flux 11 by an illumination optical system (not shown) to enter the polarization conversion element 20 included in the illumination optical system. The polarization conversion element 20 converts non-polarized light entering thereinto from the light source lamp 21 into s-polarized light. The s-polarized light exiting from the polarization conversion element 20 is reflected by the polarization beam splitter 10 and then enters the reflective liquid crystal panel 25. The light reflected and modulated by the reflective liquid crystal panel 25 becomes image light (p-polarized light) 13. The image light is transmitted through the polarization beam splitter 10, is introduced to the projection lens 30, and then is projected through the projection lens onto a projection surface such as a screen (not shown).

Using the polarization beam splitter 10 that is any one of the polarization beam splitting elements of Embodiments 1-4 enables display of bright projection images with high contrast.

[Embodiment 6]

Figure 17:
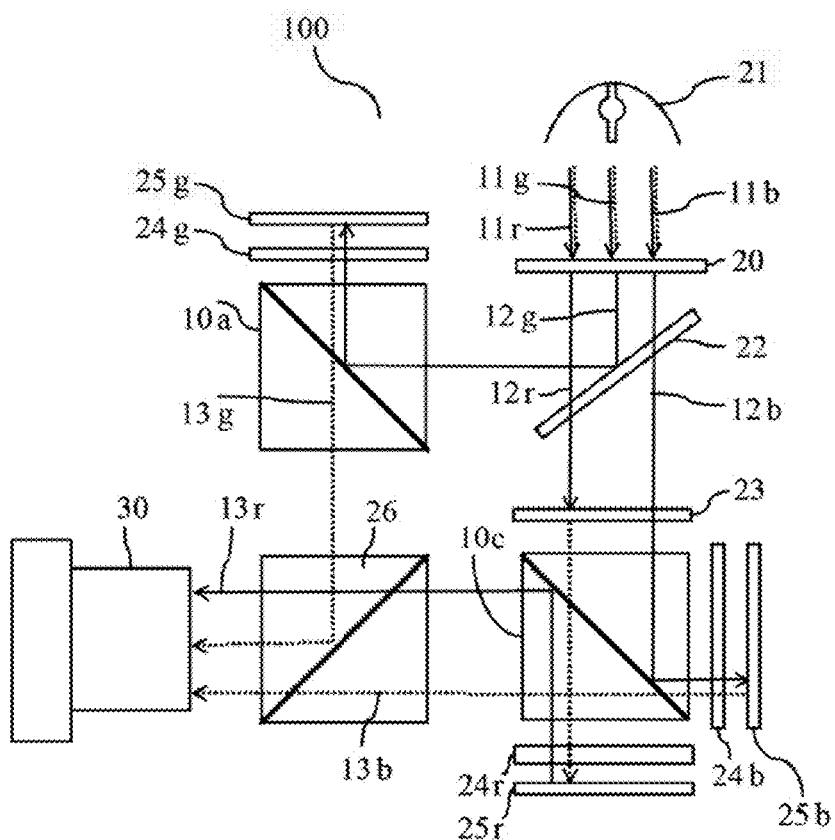
FIG. 17 shows a configuration of a liquid crystal projector that is Embodiment 6 of the present invention.

FIG. 17 shows a configuration of a liquid crystal projector (image projection apparatus) that is a sixth embodiment of the present invention, the projector using any one of the polarization beam splitting elements 10 of Embodiments 1 to 4.

The liquid crystal projector 200 includes a light source lamp 21, a polarization conversion element 20, a dichroic mirror 22, a wavelength selective phase difference plate 23 and two polarization beam splitters 10a and 10c. At least one of the polarization beam splitters 10a and 10c corresponds to the polarization beam splitting element 10 described in any one of Embodiments 1 to 4.

Moreover, the liquid crystal projector 200 includes reflective liquid crystal panels 25g, 25b and 25r, phase difference plates 24g, 24b and 24r, a color combining prism 26 and a projection lens (projection optical system) 30.

White light (including green light 11g, blue light 11b and red light 11r) emitted from the light source lamp 21 enters an illumination optical system to be converted into a collimated light flux, and enters the polarization conversion element 20 included in the illumination optical system.

The polarization conversion element 20 converts non-polarized light entering from the light source lamp 21 into s-polarized light (green polarized light 12g, blue polarized light 12b and red polarized light 12r). Next, among the green polarized light 12g, the blue polarized light 12b and the red polarized light 12r exiting from the polarization conversion element 20 and entering the dichroic mirror 22, the green polarized light 12g is reflected by the dichroic mirror 22, and the blue polarized light 12b and the red polarized light 12r are transmitted therethrough. The green polarized light 12g reflected by the dichroic mirror 22 enters the polarization beam splitter 10a and is reflected thereby, passes through the phase difference plate 24g, and then enters the reflective liquid crystal panel 25g for green.

On the other hand, the blue polarized light 12b and the red polarized light 12r transmitted through the dichroic mirror 22 enter the wavelength selective phase difference plate 23 where only the polarization direction of the red polarized light 12r is rotated by 90 degrees. Thus, the blue polarized light 12b as the s-polarized light without change and the red polarized light 12r that is p-polarized light enter the polarization beam splitter 10c.

Then, the blue polarized light 12b is reflected by the polarization beam splitter 10c, passes through the phase difference plate 24b, and then enters the reflective liquid crystal panel 25b for blue. The red polarized light 12r is transmitted through the polarization beam splitter 10c, passes through the phase difference plate 24r, and then enters the reflective liquid crystal panel 25r for red. An optical system from the dichroic mirror 22 to the polarization beam splitters 10a and 10c corresponds to a color separation optical system that separates the white light from the light source lamp 21 into plural color lights.

Each reflective liquid crystal panel reflects and modulates the entering light according to an image signal to produce image light (green image light 13g, blue image light 13b and red image light 13r). The green image light 13g modulated by the reflective liquid crystal panel 25g for green passes through the phase difference plate 24g again, and then is transmitted through the polarization beam splitter 10a to enter the color combining prism 26.

The blue image light 13b modulated by the reflective liquid crystal panel 25b for blue passes through the phase difference plate 24b again, and then is transmitted through the polarization beam splitter 10c to enter the color combining prism 26. The red image light 13r modulated by the reflective liquid crystal panel 25r for red passes through the phase difference plate 24r again, and then is reflected by the polarization beam splitter 10c to enter the color combining prism 26.

The green image light 13g is reflected by a dichroic film in the color combining prism 26, and the blue image light 13b and the red image light 13r are transmitted through the dichroic film in the color combining prism 26. Thus, the green image light 13g, the blue image light 13b and the red image light 13r are combined, and then enter the projection lens 30 to be projected thereby onto a projection surface such as a screen (not shown). The polarization beam splitter 10c and the color combining prism 26 constitute a color combination optical system.

Although this embodiment includes a color separation/combination optical system integrally constituted by the color separation optical system and the color combination optical system, a color separation optical system and a color combination optical system may be configured separately from each other, such as a case where transmissive liquid crystal panels are used as light modulation elements. Moreover, other light modulation elements than the liquid crystal panel may be used such as a digital micro-mirror device (DMD).

The liquid crystal projector of this embodiment using any one of the polarization beam splitting elements of Embodiment 1-4 as the at least one of the polarization beam splitters 10a and 10c (in particular, it is desirable that the polarization beam splitting element of Embodiment 3 be used as the polarization beam splitter 10c) enables display of bright projected images with high contrast.

Moreover, this embodiment has low p-polarized light reflectance and low s-polarized light transmittance and has less wavelength dependencies thereof, which enables achievement of high contrast even if same polarization beam splitting elements are used for the green polarized light and the blue and red polarized lights. Therefore, it is possible to use a same optical path for the blue polarized light and the red polarized light, which enables achievement of a compact image projection apparatus without decreasing contrast, as compared with a case of using an optical system that separates blue, green and red optical paths from one another.

Although this embodiment and Embodiment 5 has described the case of converting the non-polarized light from the light source lamp 21 into the s-polarized light by the polarization conversion element 20, the light from the light source lamp 21 may be converted into p-polarized light. Moreover, although this embodiment has described the case of first separating the white light into the green light and the blue and red lights by the dichroic mirror 22, other color separation may be performed.

Table 1 collectively shows relationships between Embodiments 1-4 and the conditions (1), (4), (5) and (6). Table 1 shows, as to the condition (4), values of $n_p$ and $n_{TM}$, that is, $n_p > n_{TM}$.

Moreover, Table 1 shows, as to the condition (5), values for a central wavelength $\lambda$ of 550 nm and incident angles of 35° and 55°.

In addition, Table 1 shows, as to the condition (6), values for the central wavelength $\lambda$ of 550 nm, and FF in Table 1 represents the filling factor of the wire grid 3a. Table 1 shows the upper limit and the lower limit of the condition (6), which shows that the filling factor FF is within a range between the upper limit and the lower limit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-085951, filed on Apr. 8, 2011, which is hereby incorporated by reference herein in its entirety.

TABLE 1

|  | EMBODIMENT | | | |
|---|---|---|---|---|
|  | 1 | 2 | 3 | 4 |
| CONDITION (3) $n_{TE}/n_p$ | 0.982 | 0.982 | 1.001 | 0.999 |
| CONDITION (4) $n_p$ | 1.60 | 1.60 | 1.52 | 1.80 |
| $n_{TM}$ | 1.173 | 1.173 | 1.150 | 1.308 |
| CONDITION (5) ($\theta = 35°$) | 0.290 | 0.290 | 0.290 | 0.289 |
| CONDITION (5) ($\theta = 55°$) | 0.203 | 0.203 | 0.203 | 0.203 |
| CONDITION (6) FF Upper Limit | 0.464 | 0.438 | 0.464 | 0.464 |
| CONDITION (6) FF Lower Limit | 0.634 | 0.608 | 0.634 | 0.634 |
| FF | 0.550 | 0.540 | 0.535 | 0.580 |

What is claimed is:

1. A polarization beam splitting element configured to reflect or transmit an entering beam according to its polarization direction, the element comprising in order from a beam entrance side:

a base member having a light transmissive property;

a first one-dimensional grating structure formed of a dielectric material and having, in a first direction, a first grating period smaller than a wavelength of the entering beam; and a second one-dimensional grating structure formed of a metal and having, in a second direction orthogonal to the first direction, a second grating period smaller than the wavelength of the entering beam, wherein the following condition is satisfied:

$n_p > n_{TM}$, where $n_{TM}$ represents an effective refractive index of the first one-dimensional grating structure for polarized light whose polarization direction is parallel to the first direction, and $n_p$ represents a refractive index of the base member.

2. A polarization beam splitting element according to claim 1, wherein the first and second grating periods are shorter than 150 nm.

3. A polarization beam splitting element according to claim 1, wherein the following condition is satisfied:

$$0.9 < n_{TE}/n_p < 1.1,$$

where $n_{TE}$ represents an effective refractive index of the first one-dimensional grating structure for polarized light whose polarization direction is orthogonal to the first direction.

4. A polarization beam splitting element according to claim 1, wherein the following condition is satisfied:

$$0.2 < (n_{TM} \times \cos\theta)d/\lambda < 0.3,$$

where d, in nm, represents a grating thickness of the first one-dimensional grating structure, $\lambda$, in nm, represents a central wavelength of the entering beam, and $\theta$, in degrees, represents an angle formed by a ray included in the entering beam with a normal to an interface between the base member and the first one-dimensional grating structure.

5. A polarization beam splitting element according to claim 1, wherein the second grating period of the second one-dimensional grating structure is 120 nm or less, and a grating thickness thereof is 100 nm or less.

6. A polarization beam splitting element according to claim 1, wherein the following condition is satisfied:

$$A(\Lambda/\lambda)^2 + B(\Lambda/\lambda) + 0.73 < FF < A(\Lambda/\lambda)^2 + B(\Lambda/\lambda) + 0.90,$$

where FF represents a filling factor that is a ratio w/$\Lambda$ of a grating width w of the second one-dimensional grating structure in the second direction to the second grating period $\Lambda$ thereof, $\lambda$, in nm, represents a central wavelength of the entering beam, A represents 3.5, and B represents $-2.1$.

7. An image projection apparatus comprising:
a polarization beam splitting element configured to reflect or transmit light as a entering beam from a light source according to its polarization direction;
a light modulation element configured to modulate the light from the polarization beam splitting element; and
a projection optical system configured to project the light introduced from the light modulation element through the polarization beam splitting element onto a projection surface,
wherein the polarization beam splitting element comprises in order from a beam entrance side:
a base member having a light transmissive property;
a first one-dimensional grating structure formed of a dielectric material and having, in a first direction, a first grating period smaller than a wavelength of the entering beam; and
a second one-dimensional grating structure formed of a metal and having, in a second direction orthogonal to the first direction, a second grating period smaller than the wavelength of the entering beam,
wherein, when a plane including (a) a normal to a beam entrance surface of the base member and (b) a normal to an interface between the base member and the first one-dimensional grating structure is defined as an entrance plane, a normal to the entrance plane is parallel to the first direction.

8. An image projection apparatus comprising:
a color separation optical system configured to separate light from a light source into plural color lights;
plural light modulation elements configured to respectively modulate the color lights; and
a projection optical system configured to project the color lights from the light modulation elements onto a projection surface,
wherein the color separation optical system includes a polarization beam splitting element configured to reflect or transmit the light as an entering beam from the light source according to its polarization direction,
wherein the polarization beam splitting element comprises in order from a beam entrance side:
a base member having a light transmissive property;
a first one-dimensional grating structure formed of a dielectric material and having, in a first direction, a first grating period smaller than a wavelength of the entering beam; and
a second one-dimensional grating structure formed of a metal and having, in a second direction orthogonal to the first direction, a second grating period smaller than the wavelength of the entering beam,
wherein, when a plane including (a) a normal to a beam entrance surface of the base member and (b) a normal to an interface between the base member and the first one-dimensional grating structure is defined as an entrance plane, a normal to the entrance plane is parallel to the first direction.

9. A polarization beam splitting element configured to reflect or transmit an entering beam according to its polarization direction, the element comprising in order from a beam entrance side:
a base member having a light transmissive property;
a first one-dimensional grating structure formed of a dielectric material and having, in a first direction, a first grating period smaller than a wavelength of the entering beam; and
a second one-dimensional grating structure formed of a metal and having, in a second direction orthogonal to the first direction, a second grating period smaller than the wavelength of the entering beam,
wherein the following condition is satisfied:

$$0.9 < n_{TE}/n_p < 1.1,$$

where $n_{TE}$ represents an effective refractive index of the first one-dimensional grating structure for polarized light whose polarization direction is orthogonal to the first direction, and $n_p$ represents a refractive index of the base member.

10. A polarization beam splitting element configured to reflect or transmit an entering beam according to its polarization direction, the element comprising in order from a beam entrance side:
a base member having a light transmissive property;
a first one-dimensional grating structure formed of a dielectric material and having, in a first direction, a first grating period smaller than a wavelength of the entering beam; and
a second one-dimensional grating structure formed of a metal and having, in a second direction orthogonal to the first direction, a second grating period smaller than the wavelength of the entering beam,
wherein the following condition is satisfied:

$$0.2 < (n_{TM} \times \cos\theta)d/\lambda < 0.3,$$

where d, in nm, represents a grating thickness of the first one-dimensional grating structure, $n_{TM}$ represents an effective refractive index of the first one-dimensional grating structure for polarized light whose polarization direction is parallel to the first direction, $\lambda$, in nm, represents a central wavelength of the entering beam, and $\theta$, in degrees, represents an angle formed by a ray included in the entering beam with a normal to an interface between the base member and the first one-dimensional grating structure.

11. A polarization beam splitting element configured to reflect or transmit an entering beam according to its polarization direction, the element comprising in order from a beam entrance side:

a base member having a light transmissive property;

a first one-dimensional grating structure formed of a dielectric material and having, in a first direction, a first grating period smaller than a wavelength of the entering beam; and a second one-dimensional grating structure formed of a metal and having, in a second direction orthogonal to the first direction, a second grating period smaller than the wavelength of the entering beam, wherein the following condition is satisfied:

$$A(\Lambda/\lambda)^2 + B(\Lambda/\lambda) + 0.73 < FF < A(\Lambda/\lambda)^2 + B(\Lambda/\lambda) + 0.90,$$

where FF represents a filling factor that is a ratio $w/\Lambda$ of a grating width w of the second one-dimensional grating structure in the second direction to the second grating period $\Lambda$ thereof, $\lambda$, in nm, represents a central wavelength of the entering beam, A represents 3.5, and B represents −2.1.

* * * * *